United States Patent
Loeffler

(10) Patent No.: US 11,052,711 B2
(45) Date of Patent: Jul. 6, 2021

(54) ELECTRONIC WHEEL UNIT FOR A VEHICLE WHEEL

(71) Applicant: CONTINENTAL AUTOMOTIVE GMBH, Hannover (DE)

(72) Inventor: Michael Loeffler, Zeitlarn (DE)

(73) Assignee: Continental Automotive GmbH, Hannover (DE)

( * ) Notice: Subject to any disclaimer, the term of this patent is extended or adjusted under 35 U.S.C. 154(b) by 295 days.

(21) Appl. No.: 16/310,840

(22) PCT Filed: Jun. 12, 2017

(86) PCT No.: PCT/EP2017/064231
§ 371 (c)(1),
(2) Date: Dec. 18, 2018

(87) PCT Pub. No.: WO2017/220359
PCT Pub. Date: Dec. 28, 2017

(65) Prior Publication Data
US 2020/0307326 A1  Oct. 1, 2020

(30) Foreign Application Priority Data

Jun. 21, 2016  (DE) .................... 10 2016 211 047.0

(51) Int. Cl.
*B60C 23/04*  (2006.01)

(52) U.S. Cl.
CPC ...... *B60C 23/0474* (2013.01); *B60C 23/0454* (2013.01); *B60C 23/0471* (2013.01); *B60C 23/0498* (2013.01)

(58) Field of Classification Search
CPC . B60C 23/00; B60C 23/0474; B60C 23/0471; B60C 23/0498; G01L 17/00; G08B 3/00
(Continued)

(56) References Cited

U.S. PATENT DOCUMENTS

| 5,573,611 A | 11/1996 | Koch et al. |
| 6,271,748 B1 * | 8/2001 | Derbyshire ......... B60C 23/0401 340/442 |

(Continued)

FOREIGN PATENT DOCUMENTS

| CN | 1476389 A | 2/2004 |
| CN | 104494370 A | 4/2015 |

(Continued)

*Primary Examiner* — Eric Blount
(74) *Attorney, Agent, or Firm* — Laurence A. Greenberg; Werner H. Stemer; Ralph E. Locher

(57) ABSTRACT

An electronic wheel unit for detecting a tire pressure of a tire of a vehicle wheel, for storing tire information of the tire and for sending tire pressure information and tire information. The wheel unit is configured to allow the alteration of stored tire information in a first mode of operation and to prevent the alteration of stored tire information in a second mode of operation. To improve the integrity and safety of the stored tire information in this case, the wheel unit is further configured to change from the first mode of operation to the second mode of operation when a first mode change criterion is satisfied. The satisfaction of the first mode change criterion is dependent at least on an operating parameter of the vehicle wheel that is representative of a rotational movement of the vehicle wheel.

15 Claims, 2 Drawing Sheets

(58) Field of Classification Search
USPC ............... 701/29.4; 340/426.33, 443, 442; 73/146–146.8
See application file for complete search history.

(56) References Cited

U.S. PATENT DOCUMENTS

| | | | |
|---|---|---|---|
| 6,612,165 B2 | 9/2003 | Juzswik et al. | |
| 6,630,885 B2 | 10/2003 | Hardman et al. | |
| 6,880,394 B2 | 4/2005 | Boulot | |
| 6,927,679 B2* | 8/2005 | Taguchi | B60C 23/0416 116/34 R |
| 7,482,913 B2 | 1/2009 | Kusunoki et al. | |
| 7,602,280 B2* | 10/2009 | Kato | B60C 23/0444 340/442 |
| 7,940,164 B2 | 5/2011 | Stegman et al. | |
| 8,959,990 B2 | 2/2015 | Hartmann et al. | |
| 9,446,634 B2 | 9/2016 | Wagner et al. | |
| 9,493,043 B2 | 11/2016 | Yu et al. | |
| 9,764,605 B2 | 9/2017 | Schumacher et al. | |
| 2003/0156021 A1 | 8/2003 | Tabata et al. | |
| 2003/0233872 A1* | 12/2003 | Boulot | B60C 23/0408 73/146 |
| 2008/0191840 A1 | 8/2008 | Kaga et al. | |
| 2012/0007729 A1* | 1/2012 | Patel | B60C 23/0471 340/442 |

FOREIGN PATENT DOCUMENTS

| | | | |
|---|---|---|---|
| CN | 105365502 A | 3/2016 | |
| DE | 4402136 A1 | 7/1995 | |
| DE | 10300022 A1 | 8/2003 | |
| DE | 10319092 A1 | 11/2004 | |
| DE | 60105187 T2 | 9/2005 | |
| DE | 102005059009 A1 | 6/2007 | |
| DE | 102007046492 A1 | 6/2009 | |
| DE | 102011003134 A1 | 7/2012 | |
| DE | 102012216576 A1 * | 5/2014 | ......... B60C 23/0474 |
| DE | 102012216576 A1 | 5/2014 | |
| DE | 102012216577 A1 | 5/2014 | |
| EP | 1747914 A2 | 1/2007 | |
| KR | 101481231 B1 | 1/2015 | |

* cited by examiner

ELECTRONIC WHEEL UNIT FOR A VEHICLE WHEEL

BACKGROUND OF THE INVENTION

Field of the Invention

The present invention relates to an electronic wheel unit for a vehicle wheel.

Electronic wheel units of this kind are used as wheel-based components of what are known as tire pressure monitoring systems for monitoring the tire pressure on motor vehicles. A tire pressure monitoring system of this kind, often also referred to as TPMS, permits e.g. an appropriate warning to be output to the driver of the vehicle in the event of a pressure loss at a vehicle wheel. For this purpose, each wheel unit to be arranged on a relevant vehicle wheel (e.g. on a rim, on a valve or on a tire) is equipped with means for detecting the tire pressure and with means for sending tire pressure information.

DE 10 2012 216 576 A1 discloses a wheel unit that allows detection of the tire pressure of a tire of a vehicle wheel, storage of tire information of the tire and sending of tire pressure information and tire information, the wheel unit being designed to allow storage of tire information in a first mode of operation (if it has been identified that the wheel unit is installed in a tire) and to prevent such storage of tire information in a second mode of operation (if it has been identified that the wheel unit is not installed in a tire).

Even though said wheel unit prevents tire information from being stored in the wheel unit and the wheel unit only then being integrated into a (possibly incorrect) tire, this wheel unit has e.g. the disadvantage that, in the normal driving mode of the relevant vehicle, the wheel information stored in the wheel unit is not manipulation-proof. In particular, it is e.g. not completely impossible for the stored tire information to be altered in a criminal manner.

SUMMARY OF THE INVENTION

It is an object of the present invention to improve an electronic wheel unit for a vehicle wheel in terms of the integrity or safety of stored tire information.

According to one aspect of the invention, an electronic wheel unit for detecting a tire pressure of a tire of a vehicle wheel, for storing tire information of the tire and for sending tire pressure information and tire information is specified. The wheel unit is designed to allow alteration of stored tire information in a first mode of operation and to prevent alteration of stored tire information in a second mode of operation. Further, the wheel unit is designed to change from the first mode of operation to the second mode of operation when a first mode change criterion is satisfied, the satisfaction of the first mode change criterion being dependent at least on an operating parameter of the vehicle wheel that is representative of a rotational movement of the vehicle wheel.

The basic concept of this aspect is, in particular after stored tire information is altered, e.g. after a wheel or tire change in a garage, to allow an automatic change to the second mode of operation, for example by driving off the vehicle, in which second mode of operation the stored tire information can then no longer be altered. In particular, the stored tire information is then manipulation-proof in the normal driving mode.

An additional advantage of this aspect of the invention is that, in the example above, after the tire information is altered (e.g. the tire information is stored for the first time or updated), the garage personnel does not have to perform any special handling to validate the tire information or to block subsequent further alteration of the tire information. This can instead be realized by the aforementioned automatic change to the second mode of operation.

Within the framework of this aspect of the invention, it is, however, not meant to be impossible for a change from the first mode of operation to the second mode of operation to also be able to be accomplished e.g. as required by means of an active, preferably wireless input of an appropriate change or validation command for the wheel unit. This optional development advantageously allows e.g. the change to the second mode of operation even if the vehicle is not moved or driven away immediately after the stored tire information is altered and nevertheless a change to the manipulation-proof second mode of operation is desired immediately.

The tire information of the tire can contain, by way of example, data relating to a tire manufacturer, a tire type (e.g. summer tires or winter tires, diagonal or radial design, etc.), or at least one tire dimension (e.g. a tire width, a ratio of flank height to bearing surface width, a tire diameter, etc.). Furthermore, the tire information can contain e.g. data relating to a bearing strength index and/or a speed index. In other words, the tire information of the tire preferably contains data selected from the group consisting of a tire manufacturer, a tire type, a tire dimension, a bearing strength index and a speed index of the tire.

Storage of the tire information can be effected e.g. when the relevant vehicle wheel or tire is fitted, and has the advantage that, without significant additional sophistication, not only the tire pressure information but also the tire information is available in the wheel unit and can be sent to an appropriate reception device of the vehicle, the tire information advantageously being able to be used e.g. for controlling driving dynamics functions (e.g. ABS, ESP, etc.), suspension tuning by the vehicle and/or for controlling further functionalities of the wheel unit (e.g. tire contact area ascertainment, tread depth ascertainment, wheel load ascertainment, etc.).

As already explained, a movement of the vehicle is detected by checking the first mode change criterion, the satisfaction of this criterion being dependent at least on the operating parameter of the vehicle wheel that is representative of the rotational movement of the relevant vehicle wheel.

In a particularly simple embodiment, a rotation speed of the relevant vehicle wheel is used as an operating parameter of this kind, i.e. the satisfaction of the first mode change criterion is dependent at least on a value of a rotation speed of the vehicle wheel.

In this case, the satisfaction of the first mode change criterion can e.g. at least presuppose that the value of the rotation speed of the vehicle wheel is above a predetermined threshold value. This threshold value may be e.g. firmly prescribed and may be prescribed e.g. in a range from 1.5 rpm (revolutions per minute) to 7 rpm. Since the wheel unit may know the diameter of the vehicle wheel (e.g. on the basis of the stored tire information), an operating parameter representing the rotation speed of the vehicle wheel that can be used for the first mode change criterion is alternatively also the vehicle speed, which is linked to the rotation speed of the vehicle wheel, the satisfaction of the criterion being able to presuppose e.g. at least that the value of this applicable vehicle speed is above a predetermined threshold value, which may be prescribed e.g. in the range from 5 km/h to 30 km/h.

In the simplest case, the relevant operating parameter of the vehicle wheel, that is to say e.g. the rotational angular velocity of the vehicle wheel and/or an equivalent vehicle speed, is monitored for an applicable instance of a threshold value being exceeded.

Further, there may also be more complex provision for the first mode change criterion with regard to taking into consideration the rotational movement of the vehicle wheel, for example by virtue of a rotational acceleration of the vehicle wheel alternatively or additionally being taken into consideration for the satisfaction of the criterion and/or by virtue of a time profile (that is to say not just an instantaneous value) of one or more operating parameters representative of the rotational movement being taken into consideration.

As far as the manner of detection of an operating parameter representative of the rotational movement of the vehicle wheel is concerned, this can involve an acceleration measured by the wheel unit (e.g. a radial acceleration) being evaluated e.g. directly.

Furthermore, the satisfaction of the first mode change criterion may further be dependent on other parameters, in particular those detectable by the wheel unit directly. A further possibility, however, is parameters ascertained on the vehicle and then communicated to the wheel unit, e.g. via a radio connection.

In this regard, in one development, there is provision for the satisfaction of the first mode change criterion to be further dependent on a content of the stored tire information. This can prevent e.g. implausible or blank tire information from being validated as a result of the wheel unit changing to the second mode of operation.

At this juncture and below, the term "blank" is supposed to mean that the tire-specific data provided as tire information have not yet been stored in the first place, or such data have been erased.

In view of this case, according to one development, there is provision for the satisfaction of the first mode change criterion to presuppose that the tire information is not blank.

The electronic wheel unit may further be designed to change from the second mode of operation to the first mode of operation when a second mode change criterion is satisfied, the satisfaction of the second mode change criterion being dependent at least on the operating parameter of the vehicle wheel that is representative of a rotational movement of the vehicle wheel. From the second mode of operation, in which alteration of the stored tire information is blocked, for example in the normal driving mode of the vehicle, this can result in an automatic change to the first mode of operation being made as required, the satisfaction of the second mode change criterion provided for this purpose being at least again dependent on the operating parameter of the vehicle wheel that is representative of the rotational movement of the vehicle wheel.

As far as the specific choice of this operating parameter and any joint consideration of further operating parameters are concerned, reference should first of all be made to the explanations already provided above regarding such an operating parameter representative of the rotational movement of the vehicle wheel (and any further operating parameters) in connection with the first mode change criterion. These explanations apply accordingly to the operating parameter(s) that can be taken into consideration for the satisfaction of the second mode change criterion.

As such, the satisfaction of the second mode change criterion may be dependent e.g. at least on the value of the rotation speed of the vehicle wheel.

Unlike in the embodiment explained for the first mode change criterion, in which the satisfaction of the criterion presupposes that the value of the rotation speed of the vehicle wheel is above a predetermined threshold value, the second mode change criterion has provision, according to one embodiment, for the satisfaction thereof to at least presuppose that the value of the rotation speed is below a predetermined threshold value.

As far as the prescribing, e.g. firm prescribing, of this threshold value is concerned, reference is again made to the explanations already provided earlier on in connection with a threshold value possibly provided for the first mode change criterion. The ranges specified earlier on, whether a range for the rotation speed (e.g. in revolutions per minute) or a range for a vehicle speed, which is linked thereto via the vehicle wheel diameter and therefore equivalent, may also be provided for the threshold value possibly taken into consideration for the second mode change criterion.

In a particularly preferred embodiment, there is provision for the satisfaction of the second mode change criterion to further presuppose that the tire pressure is below a predetermined threshold value.

This threshold value may be e.g. firmly prescribed and e.g. prescribed in a range from 1 bar to 1.6 bars, preferably in a range from 1.3 bars to 1.5 bars.

In the latter embodiment, for example the following scenario may arise in practice: If e.g. a tire pressure drops drastically in the normal driving mode of the vehicle (which can be signaled to the driver e.g. by the tire pressure monitoring system) and the driver then slows down the vehicle or brings it to a standstill such that the relevant threshold value for the rotation speed of the relevant vehicle wheel or the threshold value for the vehicle speed is not exceeded, then the wheel unit changes to the first mode of operation.

In a preferred embodiment of a change from the second mode of operation to the first mode of operation, which is caused by the satisfaction of the second mode change criterion, there is provision for the stored tire information to be invalidated, which is supposed to mean that, although the tire information remains stored, associated information is recorded or stored in the wheel unit (e.g. by setting a "flag") stating that this tire information is not valid. In view of the above example of a drastic pressure loss, this is very useful, since a flat tire no longer meets the tire specifications according to the stored tire information.

Keeping the stored tire information when changing to the second mode of operation has the advantage that garage personnel does not have to store the tire information corresponding to the tire in the wheel unit again when repairing the tire (or possibly just refilling the tire, typically with air or nitrogen).

Rather, there may be provision for the stored tire information just to be validated again e.g. by the garage personnel after the tire repair or e.g. the fitting of a tire that is identical in terms of its specifications. The latter validation can also be effected automatically (if the first mode change criterion is satisfied) using the aforementioned aspect of the invention. Such a validation can result in e.g. a "flag" provided for that purpose being set such that it indicates that the stored tire data are valid.

If there is provision in the wheel unit for stored tire information to be validated and invalidated, there is preferably provision for any change from the first mode of operation to the second mode of operation to be synonymous with a validation or to cause such a validation, whereas any change from the second mode of operation to the first mode of of operation is or causes an invalidation. It is, however, not meant to be impossible in this case for a change from the second mode of operation to the first mode of operation to result in the stored tire information being erased.

In one development of the invention, the wheel unit is further designed

- to operate either in a first operating state, which prevents alteration of stored tire information, or in a second operating state, which permits alteration of stored tire information, in the first mode of operation,
- to change from the first operating state to the second operating state when a first state change criterion is satisfied, and
- to perform the change from the first mode of operation to the second mode of operation from the second operating state and to perform the change from the second mode of operation to the first mode of operation into the first operating state.

In this development, there is accordingly provision for there to be two distinguishable submodes in the first mode of operation, referred to in this case as the first operating state and the second operating state, and for alteration of stored tire information, be it storage, alteration in the narrower sense or erasure, not to be possible generally in the first mode of operation, but rather only if the wheel unit is in the second operating state during the first mode of operation.

Further, this development preferably specifies that (automatic) changes between the two operating states are made if a state change criterion respectively provided for that purpose is satisfied (satisfaction thereof is tested by the wheel unit).

Finally, this development also specifies that operating state of the first mode of operation from which the change to the second mode of operation is made and that operating state into which the change from the second mode of operation to the first mode of operation is made.

In this development, e.g. the following scenario may arise in practice: If a vehicle is taken e.g. to a garage following a drastic pressure loss from a tire and the relevant tire is disposed of or repaired after the electronic wheel unit is dismounted, then this development can be used to ensure that the stored tire information can be altered (or alternatively or additionally the tire information can be validated) only when the wheel unit has been integrated in a new or in the repaired tire, which the wheel unit can establish by checking the first state change criterion. If this criterion is satisfied, then a change from the first operating state to the second operating state is made and it is possible for stored tire information to be altered.

In one embodiment, there is provision for the satisfaction of the first state change criterion to be dependent at least on the operating parameter of the vehicle wheel that is representative of a rotational movement of the vehicle wheel and/or on the tire pressure.

As far as the specific choice of the operating parameter of the vehicle wheel that is representative of the rotational movement of the vehicle wheel is concerned, reference should first of all again be made to the explanations already provided earlier on regarding operating parameters suitable for that purpose.

In particular, the satisfaction of the first state change criterion can e.g. presuppose that the value of the rotation speed of the vehicle wheel is below a predetermined threshold value.

Alternatively or additionally, there may be provision for the satisfaction of the first state change criterion to presuppose that the tire pressure is above a predetermined threshold value.

There may be provision for the prescribing of such threshold values for the rotation speed and for the tire pressure for the first state change criterion in respective ranges, which have already been described earlier on in connection with the checking of the first and second mode change criteria.

A further prerequisite for the satisfaction of the first state change criterion may be e.g. that the wheel unit is provided with a change command provided for that purpose, for example a command sent to the wheel unit wirelessly, e.g. by radio. If this command needs to be given intentionally by a user such as garage personnel, for example, then this can reduce the risk of the stored tire information being altered inadvertently or incorrectly.

For the wireless transmission of such a change command or devices suitable for that purpose, it is possible e.g. to resort to known radio transmission methods. If need be, the change command may be e.g. part of a data signal transmitted to the wheel unit by radio technology, by means of which data signal a desired alteration to the stored wheel information is also caused, said data signal thus containing e.g. altered tire information data.

The wheel unit may further be designed to change from the second operating state to the first operating state when a second state change criterion is satisfied.

The satisfaction of the second state change criterion can e.g. presuppose that the tire pressure is below a predetermined threshold value. With regard to suitable prescribing of this threshold value, reference is made to the explanations already provided earlier on concerning the proportioning of a tire pressure threshold value to take into consideration for the second mode change criterion and the first state change criterion (that is to say e.g. approximately 1.5 bars).

The provision of a second state change criterion has in particular the advantage that it can achieve the situation that a change to the second mode of operation cannot be made after the tire information is altered (in the second operating state) and the wheel unit is subsequently removed from the relevant tire again. Rather, in this case, the detection of the tire pressure below the threshold value would cause the wheel unit to change from the second operating state to the first operating state again, so that only after reintegration of the wheel unit into a (possibly different) tire is it possible for the wheel unit to change to the second operating state again and subsequently (e.g. after the first mode change criterion is satisfied) to change to the second mode of operation.

BRIEF DESCRIPTION OF THE SEVERAL VIEWS OF THE DRAWING

The invention is described in more detail below on the basis of exemplary embodiments with reference to the enclosed drawings, in which.

DESCRIPTION OF THE INVENTION

Figure 1:
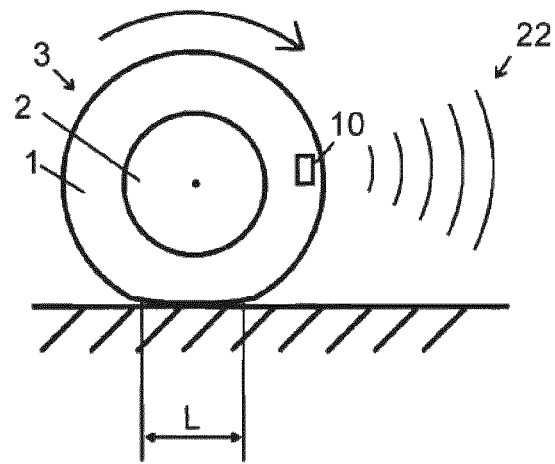
FIG. 1 shows a side view of a vehicle wheel equipped with an electronic wheel unit according to one exemplary embodiment.

FIG. 1 shows a tire 1 that, together with a rim 2, forms a vehicle wheel 3 of a motor vehicle (not depicted).

The vehicle wheel 3 has an electronic wheel unit 10 arranged on it, specifically on an inner side of a tire bearing surface of the e.g. air-filled tire 1 (e.g. glued on or e.g. inserted in a pocket or e.g. detachably mounted on a glued-in support) in the depicted example.

The main purpose of the wheel unit 10 is to measure the tire pressure in the tire 1 during operation of the relevant vehicle and, from time to time, to send applicable measurement results to a vehicle-based radio reception device (not depicted), i.e. one arranged in the relevant vehicle, by means of electromagnetic signals in the form of radio signals 22.

The radio reception device decodes data included in the radio signal 22 and forwards said data to a central controller (not depicted) of the vehicle e.g. via a digital bus system (not depicted). The data included in the radio signal 22, in this case in particular measured values for the tire pressure, are evaluated by the central controller and/or made available for further use in other parts of on-board electronics of the vehicle.

A further purpose of the electronic wheel unit 10 in the depicted exemplary embodiment is, from time to time, to transmit measurement results concerning a tire contact area, in this case e.g. a length L of a tire contact surface of the tire 1 when the tire 1 is rolling (cf. arrow in FIG. 1) on a driving surface, by means of the radio signals 22.

Further, the radio signals 22 can be used to send data of tire information stored in the wheel unit 10 to the vehicle in part or in full. Tire-specific data of this kind can be used by the vehicle e.g. advantageously for controlling driving dynamics functions (ABS, ESP, etc.). Alternatively or additionally, there may be provision for the stored tire information to be used by the wheel unit 10 itself, for example in connection with the aforementioned detection of the tire contact area or other functionalities of the wheel unit 10 (e.g. tread depth ascertainment, wheel load ascertainment, etc.).

In view of the typical case of multiple vehicle wheels on the same vehicle being equipped with electronic wheel units 10 of this kind, the data sent to the vehicle with the respective radio signal 22 finally also include an identification code identifying the sending wheel unit 10.

The correct tire information, i.e. that matching the tire 1, can be stored in the wheel unit 10 provided for this tire 1 e.g. when the vehicle wheel 3 or the tire 1 is fitted to the relevant vehicle.

Figure 2:
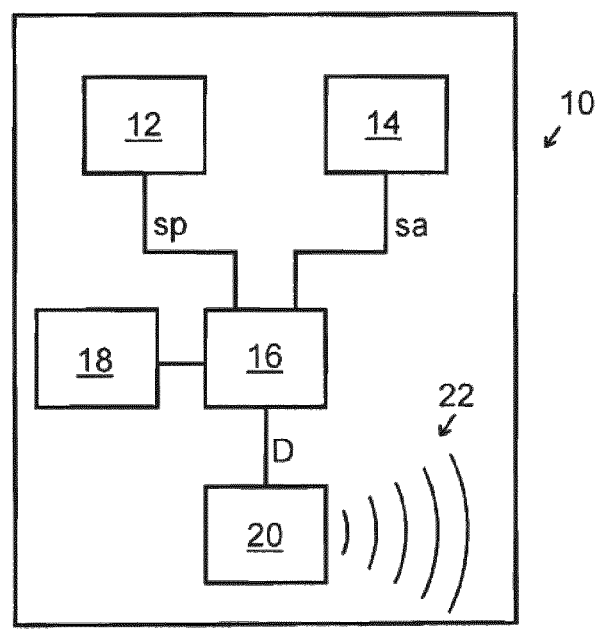
FIG. 2 shows a block diagram of the electronic wheel unit from FIG. 1.

FIG. 2 shows the design of the electronic wheel unit 10 in more detail.

The wheel unit 10 contains a pressure sensor 12 for measuring the instantaneous tire pressure and an acceleration sensor 14 for measuring an instantaneous acceleration (in this case e.g. a radial acceleration). The pressure sensor 12 outputs a sensor signal "sp" representing the instantaneous tire pressure.

A rotation of the vehicle wheel 3, symbolized by an arrow in FIG. 1, results in the acceleration sensor 14 measuring the radial acceleration present at the point at which the wheel unit 10 is arranged and outputting a corresponding sensor signal "sa".

Since this acceleration is made up of a component caused by the gravitation and a component caused by the rotation of the wheel 3, an appropriate evaluation of the sensor signal "sa" of the acceleration sensor 14 (e.g. by means of extraction of the gravitation component) allows the instantaneous rotational angular position and the instantaneous rotational angular velocity of the wheel 3 to be ascertained. Moreover, the tire contact surface formed in the lower circumferential region of the wheel 3 results in corresponding signal characteristics in the sensor signal delivered by the acceleration sensor 14 whenever the wheel unit 10 passes through the region of this tire contact surface.

These signal characteristics, which arise periodically e.g. when traveling at constant speed, can therefore also be taken as a basis for ascertaining when the wheel unit 10 passes through the tire contact surface and, by virtue of a further evaluation of the sensor signal, in a simple manner the instantaneous rotational angular position (and therefore also the rotational angular velocity) of the wheel 3.

Further, it would e.g. also be possible for what is known as a shock sensor or a deformation sensor or another suitable sensor to be used instead of the acceleration sensor 14 in order to realize detection of a rotational angular position and/or rotational angular velocity by means of evaluation of the sensor signal of said sensor.

In the wheel unit 10, the measured values representative of the tire pressure and the acceleration, as can be seen in FIG. 2, are communicated to a program-controlled evaluation device, in this case a microcontroller 16, which takes them as a basis for producing data D and forwards said data to a radio transmission device 20, by means of which a respective radio signal 22 including these data D is sent.

The microcontroller 16 is connected to a memory device 18 associated with the microcontroller 16, which memory device, in the exemplary embodiment depicted, stores a program controlling the operation of the microcontroller 16 and the aforementioned tire information.

The storage of the tire information or a subsequent update of the tire information in the memory device 18 can be realized e.g. by virtue of the depicted radio transmission device 20 also having a functionality for receiving applicable radio signals, in order to wirelessly transmit tire information to the memory device 18 via this radio transmission device 20 and the microcontroller 16. Alternatively, the wheel unit 10 may be equipped e.g. with a radio reception device provided specifically for that purpose.

The innovation according to the present invention relates in the depicted exemplary embodiment to the manner of operation of the wheel unit 10 or the microcontroller 16 thereof in connection with the alteration of the tire information stored in the memory device 18, as explained in more detail below.

Figure 3:
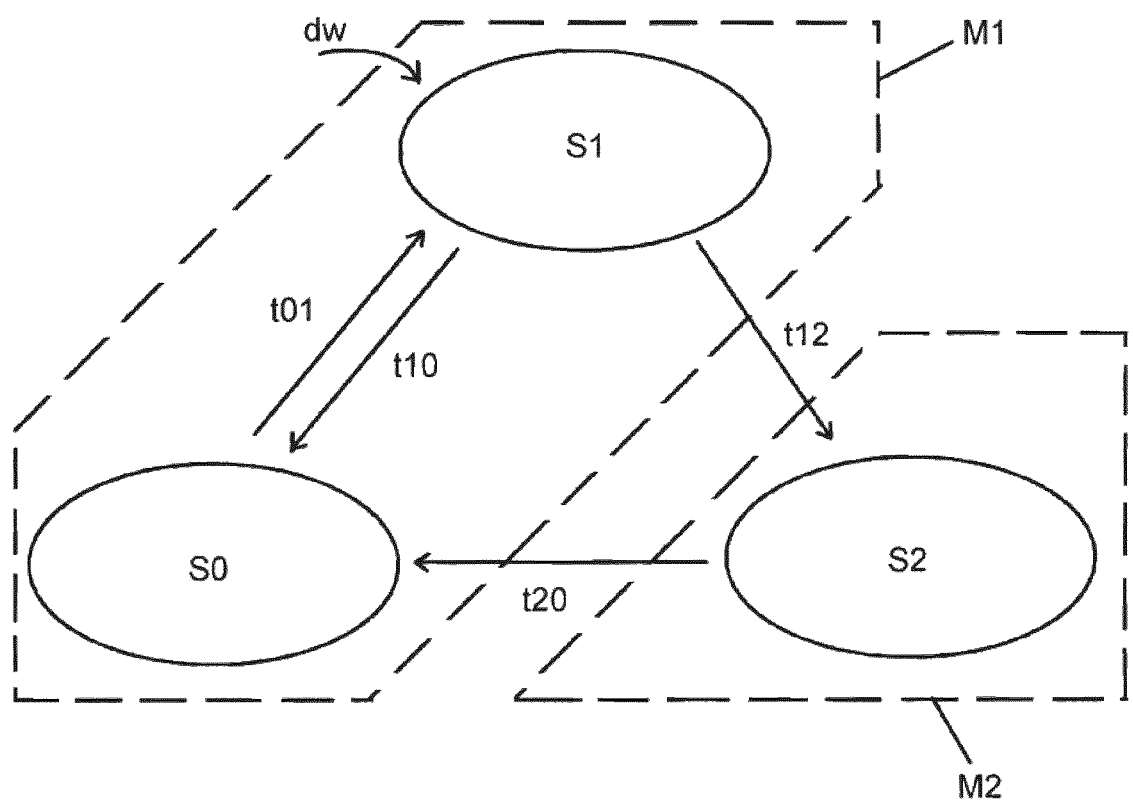
FIG. 3 shows a diagram to illustrate different modes of operation and different operating states of the electronic wheel unit.

In this regard, FIG. 3 illustrates operating states S0, S1 and S2 of the wheel unit 10 that are provided in the depicted exemplary embodiment. On the basis of the program control of the microcontroller 16, these operating states are implemented, in the depicted exemplary embodiment, by the software (control program) stored in the memory device 18.

In addition, the possible changes between the operating states S0, S1 and S2 in the depicted example are symbolized by applicable arrows t01, t10, t12 and t20 in FIG. 3.

The operating states S0 and S1 together form a first mode of operation M1, whereas the operating state S2 is synonymous with a second mode of operation M2 in the depicted example.

The operating state S0 is an "invalid data state", in which the tire information stored in the wheel unit 10 is invalid or blank. The invalidity of the tire information may be implemented in software e.g. by setting an appropriate "flag".

The operating state S0 obtains, by way of example, when the wheel unit 10 is provided in a garage for integration into the vehicle wheel 3 or the tire 1. The wheel unit 10 is designed to prevent alteration of stored tire information in the operating state S0.

Alteration of stored tire information, e.g. transmission of (updated) tire information to the wheel unit 10, is enabled in the operating state S1, on the other hand. Such a data transmission is symbolized by the arrow "dw" in FIG. 3. In the operating state S1, it is possible e.g. for tire information to be stored or for already stored tire information to be updated.

The change t01 from the first operating state S0 to the second operating state S1 is made as soon as the wheel unit 10 identifies that a first state change criterion is satisfied. The first state change criterion is satisfied in the depicted example when the detected tire pressure is above a predetermined threshold value (in this case e.g. 1.5 bars) and the detected rotation speed of the vehicle wheel 3 or tire 1 is below a predetermined threshold value (in this case e.g. 4 rpm) and a change command transmitted by radio technology is received. The change command is sent e.g. by garage personnel (by means of suitable technical equipment) in this case. Separately from this change command or within the same radio signal, it is then possible for the radio transmission dw of data for altering the stored tire information to be effected.

The operating state S1 is therefore a "write state", in which alteration of stored tire information is enabled.

Optionally, there may be provision in the operating state S1 for validation of the stored tire information, which can be brought about e.g. by the garage personnel, also to be enabled (e.g. again in a manner using radio technology).

The change from the operating state S1 back to the operating state S0 is made when a second state change criterion is satisfied, which, in the depicted example, is satisfied when the tire pressure is below a predetermined threshold value. In this case, the tire information can be altered further (or if need be a validation can be effected) only when satisfaction of the first state change criterion results in a change from the operating state S0 to the operating state S1 being made again.

From the operating state S1, the change t12 to the operating state S2 is made, synonymous with a change from the first mode of operation M1 to the second mode of operation M2, when a first mode change criterion is satisfied, this criterion being satisfied in the depicted example if the stored tire information is "not blank" and the detected rotation speed of the vehicle wheel 3 or tire 1 is above a predetermined threshold value.

In the depicted example, the threshold value for the rotation speed is chosen such that it identifies when a driving mode of the relevant vehicle begins, and thus the change to the operating state S2 is triggered if the tire information is "not blank".

The operating state S2 is a "Valid data/blocked data state" in which the stored tire information is regarded as valid and alteration of the stored tire information is prevented. In the normal driving mode of the vehicle, it is therefore impossible for the stored tire information to be manipulated e.g. inadvertently or in a criminal manner.

The change t20 from the operating state S2 or the second mode of operation M2 to the operating state S0 or the first mode of operation M1 is made when a second mode change criterion is satisfied, this being satisfied in the depicted example if the tire pressure is below a predetermined threshold value and the rotation speed of the vehicle wheel 3 or of the tire 1 is below a predetermined threshold value.

In the depicted example, this second mode change criterion detects e.g. the case in which the tire 1 bursts or drastically loses tire pressure in another manner and the vehicle is brought to a standstill.

Optionally, the change t20 may have provision for the stored tire information to be erased and therefore "blank" tire information to result.

LIST OF REFERENCE SIGNS 1 tire
2 rim
3 vehicle wheel
L tire contact area length
10 electronic wheel unit
12 pressure sensor
sp sensor signal of the pressure sensor
14 acceleration sensor
sa sensor signal of the acceleration sensor
16 microcontroller
18 memory device
D data
20 radio transmission device
22 radio signal
M1 first mode of operation
M2 second mode of operation
S0 first operating state of the first mode of operation
S1 second operating state of the first mode of operation
S2 operating state of the second mode of operation
dw transmission of data (alteration of tire information)

The invention claimed is:

1. An electronic wheel unit for detecting a tire pressure of a tire of a vehicle wheel, for storing tire information of the tire and for sending tire pressure information and tire information, the electronic wheel unit comprising:
   a memory containing stored tire information;
   the wheel unit being configured to allow an alteration of the stored tire information in a first mode of operation and to prevent an alteration of the stored tire information in a second mode of operation;
   the wheel unit being further configured to change from the first mode of operation to the second mode of operation when a first mode change criterion is satisfied, wherein a satisfaction of the first mode change criterion is dependent at least on an operating parameter of the vehicle wheel that is representative of a rotational movement of the vehicle wheel;
   wherein the stored tire information, which is prevented from being altered in the second mode of operation and which is allowed to be altered in the first mode of operation, includes at least one item of data selected from the group consisting of a tire manufacturer, a tire type, a tire dimension, a bearing strength index and a speed index.

2. The electronic wheel unit according to claim 1, wherein the satisfaction of the first mode change criterion is dependent on a value of a rotational speed of the vehicle wheel.

3. The electronic wheel unit according to claim 2, wherein the satisfaction of the first mode change criterion at least requires the value of the rotational speed of the vehicle wheel to lie above a predetermined threshold value.

4. The electronic wheel unit according to claim 1, wherein the satisfaction of the first mode change criterion is further dependent on a content of the stored tire information.

5. The electronic wheel unit according to claim 4, wherein the satisfaction of the first mode change criterion requires that the tire information is not blank.

6. The electronic wheel unit according to claim 1, wherein the wheel unit is further configured to change from the second mode of operation to the first mode of operation when a second mode change criterion is satisfied, a satisfaction of the second mode change criterion being dependent at least on the operating parameter of the vehicle wheel that is representative of the rotational movement of the vehicle wheel.

7. The electronic wheel unit according to claim 6, wherein the satisfaction of the second mode change criterion is dependent at least on a value of the rotational speed of the vehicle wheel.

8. The electronic wheel unit according to claim 7, wherein the satisfaction of the second mode change criterion at least requires the value of the rotational speed of the vehicle wheel to lie below a predetermined threshold value.

9. The electronic wheel unit according to claim 8, wherein the satisfaction of the second mode change criterion further requires the tire pressure to lie below a predetermined threshold value.

10. The electronic wheel unit according to claim 1, wherein the wheel unit is further configured:
to operate either in a first operating state, which prevents the alteration of the stored tire information, or in a second operating state, which permits the alteration of the stored tire information, in the first mode of operation;
to change from the first operating state to the second operating state when a first state change criterion is satisfied; and
to perform a change from the first mode of operation to the second mode of operation starting in the second operating state and to perform a change from the second mode of operation to the first mode of operation in the first operating state.

11. The electronic wheel unit according to claim 10, wherein a satisfaction of the first state change criterion is dependent at least on the operating parameter of the vehicle wheel that is representative of the rotational movement of the vehicle wheel and/or on the tire pressure.

12. The electronic wheel unit according to claim 10, wherein the wheel unit is further configured to change from the second operating state to the first operating state when a second state change criterion is satisfied.

13. The electronic wheel unit according to claim 12, wherein a satisfaction of the second state change criterion requires the tire pressure to lie below a predetermined threshold value.

14. An electronic wheel unit for detecting a tire pressure of a tire of a vehicle wheel, for storing tire information of the tire and for sending tire pressure information and tire information, the electronic wheel unit comprising:
a memory containing stored tire information;
the wheel unit being configured to allow an alteration of the stored tire information in a first mode of operation and to prevent an alteration of the stored tire information in a second mode of operation;
the wheel unit being further configured to change from the first mode of operation to the second mode of operation when a first mode change criterion is satisfied, wherein a satisfaction of the first mode change criterion is dependent at least on an operating parameter of the vehicle wheel that is representative of a rotational movement of the vehicle wheel;
wherein the satisfaction of the first mode change criterion is dependent on a value of a rotational speed of the vehicle wheel.

15. The electronic wheel unit according to claim 14, wherein the satisfaction of the first mode change criterion at least requires the value of the rotational speed of the vehicle wheel to lie above a predetermined threshold value.

* * * * *